US012713008B2

(12) United States Patent
Zhao et al.

(10) Patent No.: US 12,713,008 B2
(45) Date of Patent: Aug. 18, 2026

(54) JOINT INTRA MODE CODING

(71) Applicant: Tencent America LLC, Palo Alto, CA (US)

(72) Inventors: Liang Zhao, Palo Alto, CA (US); Xin Zhao, Palo Alto, CA (US); Jing Ye, Palo Alto, CA (US); Han Gao, Palo Alto, CA (US); Madhu Peringassery Krishnan, Palo Alto, CA (US); Yushin Cho, Palo Alto, CA (US); Shan Liu, Palo Alto, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 9 days.

(21) Appl. No.: 18/815,666

(22) Filed: Aug. 26, 2024

(65) Prior Publication Data

US 2025/0240404 A1 Jul. 24, 2025

Related U.S. Application Data

(60) Provisional application No. 63/624,268, filed on Jan. 23, 2024.

(51) Int. Cl.

*H04N 19/105* (2014.01)
*H04N 19/159* (2014.01)
*H04N 19/176* (2014.01)
*H04N 19/70* (2014.01)

(52) U.S. Cl.

CPC ......... *H04N 19/105* (2014.11); *H04N 19/159* (2014.11); *H04N 19/176* (2014.11); *H04N 19/70* (2014.11)

(58) Field of Classification Search

CPC .. H04N 19/105; H04N 19/159; H04N 19/176; H04N 19/70; H04N 19/11; H04N 19/186; H04N 19/463; H04N 19/593; H04N 19/42; H04N 19/91

See application file for complete search history.

(56) References Cited

U.S. PATENT DOCUMENTS

| | | | | |
|---|---|---|---|---|
| 9,332,283 | B2 * | 5/2016 | Chen | H04N 19/70 |
| 2011/0206123 | A1 * | 8/2011 | Panchal | H04N 19/147 375/E7.243 |
| 2012/0106649 | A1 * | 5/2012 | Wang | H04N 19/186 375/240.18 |
| 2019/0379914 | A1 * | 12/2019 | Misra | H04N 19/186 |
| 2020/0014920 | A1 * | 1/2020 | Zhao | H04N 19/146 |
| 2021/0168385 | A1 * | 6/2021 | Li | H04N 19/124 |
| 2021/0185326 | A1 * | 6/2021 | Wang | H04N 19/176 |
| 2022/0201336 | A1 * | 6/2022 | Filippov | H04N 19/573 |
| 2024/0056572 | A1 * | 2/2024 | Lee | H04N 19/159 |

* cited by examiner

*Primary Examiner* — Richard A Hansell, Jr.

(74) *Attorney, Agent, or Firm* — Morgan, Lewis & Bockius LLP

(57) ABSTRACT

The various implementations described herein include methods and systems for coding video. In one aspect, a method includes receiving a video bitstream comprising a plurality of blocks. The method also includes identifying, by parsing a single syntax from the video bitstream, two or more parameters associated with an intra prediction mode for a first block in the plurality of blocks. The method further includes reconstructing the first block using the intra prediction mode and the two or more parameters.

17 Claims, 7 Drawing Sheets

FIG. 1

JOINT INTRA MODE CODING

RELATED APPLICATIONS

This application claims priority to U.S. Provisional Patent Application No. 63/624,268, entitled "Joint Intra Mode Coding" filed Jan. 23, 2024, which is hereby incorporated by reference in its entirety.

TECHNICAL FIELD

The disclosed embodiments relate generally to video coding, including but not limited to systems and methods for intra prediction mode coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to intra prediction modes and joint signaling techniques for multiple intra prediction parameters (e.g., using a single syntax). For example, a single syntax may be used to identify a selected combination of two intra prediction parameters (e.g., an angular prediction mode, and a reference line index) that is stored in a look-up table or a list. By providing a look-up table populated with entries that reflect more probable combinations of intra prediction parameters, signaling overhead for entropy coding may be reduced due to the use of a single syntax to convey information associated with multiple intra prediction parameters. Further, the look-up table may also be used for neighboring blocks, and the accuracy of the prediction for the current block may improve due to additional information gleaned from the neighboring blocks (e.g., combinations stored in the look-up table, and/or indices of entries accessed in the look-up table by a neighboring block).

In accordance with some embodiments, a method of video decoding includes (i) receiving a video bitstream (e.g., a coded video sequence) comprising a plurality of blocks (e.g., corresponding to a set of pictures); (ii) identifying, by parsing a single syntax from the video bitstream, two or more parameters associated with an intra prediction mode for a first block in the plurality of blocks; and (iii) reconstructing the first block using the intra prediction mode and the two or more parameters.

In accordance with some embodiments, a method of video encoding includes (i) receiving video data (e.g., a source video sequence) comprising a plurality of blocks (e.g., corresponding to a set of pictures); (ii) when two or more parameters associated with an intra prediction mode for a first block in the plurality of blocks are to be signaled jointly, signal a single syntax in a video bitstream to indicate the two or more parameters; and (iii) when two or more parameters associated with an intra prediction mode for a first block in the plurality of blocks are to be signaled separately, signal a separate syntax in the video bitstream to indicate each of the two or more parameters; and (iv) encoding the first block using the intra prediction mode and the two or more parameters.

In accordance with some embodiments, a method of processing visual media data includes: (i) obtaining a source video sequence that includes a plurality of frames; and (ii) performing a conversion between the source video sequence and a video bitstream of visual media data according to a format rule. The bitstream comprises a plurality of blocks, including a first block and a syntax element indicating two or more parameters associated with an intra prediction mode of the first block. The format rule specifies that the first block is to be reconstructed using the intra prediction mode and the two or more parameters.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
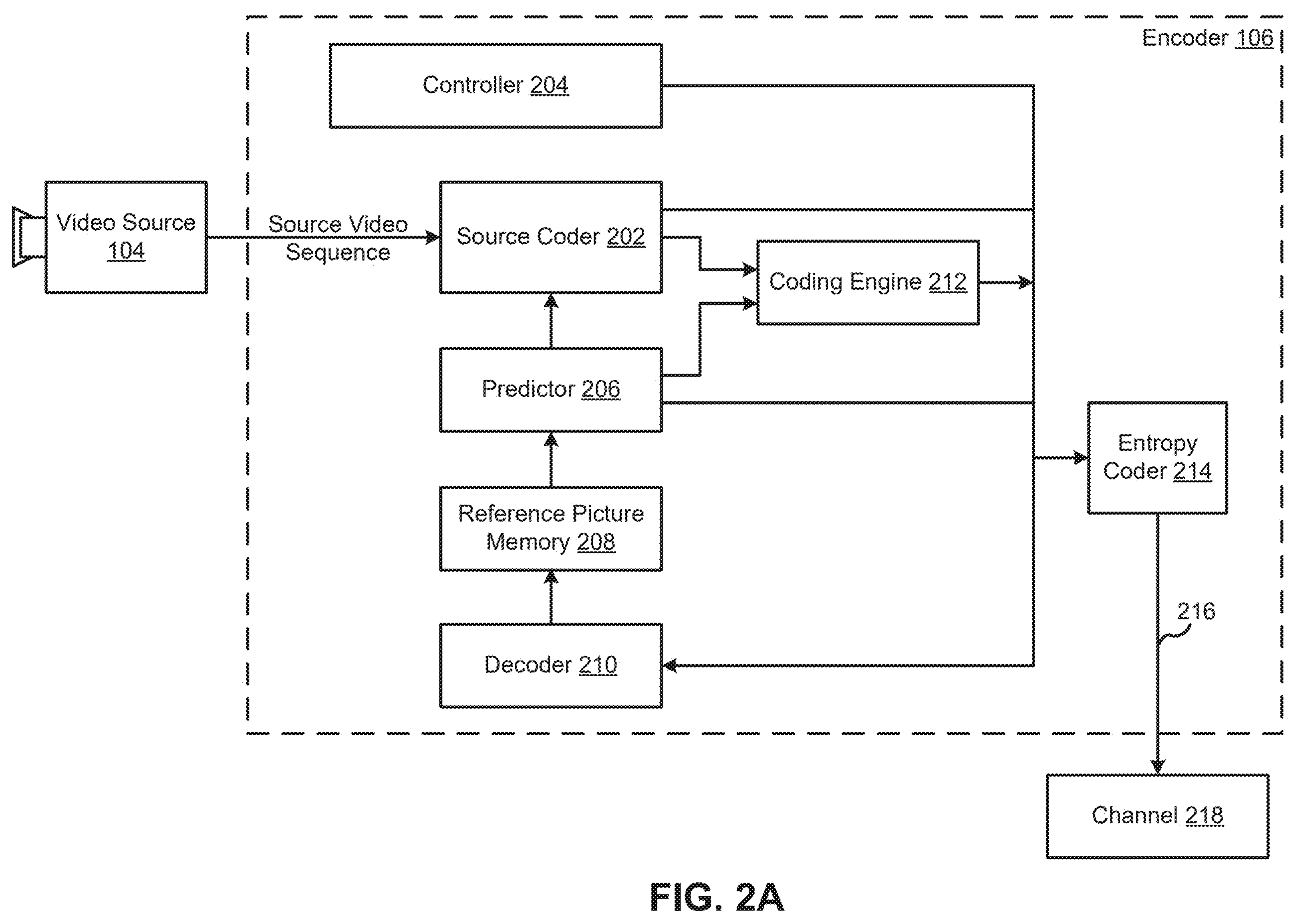
FIG. 2A is a block diagram illustrating example elements of an encoder component in accordance with some embodiments.

The present disclosure describes video/image compression techniques including intra prediction modes and techniques of jointly signaling multiple intra prediction parameters using a single syntax. For example, a single syntax may be used to identify multiple intra prediction parameters (e.g., such as an angular prediction mode and a reference line index). The single syntax may correspond to (e.g., entropy encode) an index to a look-up table or list with each entry having values for multiple parameters. An advantage joint signaling is reduced signaling overhead (e.g., using one syntax instead of multiple syntaxes to convey information associated with multiple intra prediction parameters). Further, prediction accuracy may also be improved by using a look-up table populated with entries that reflect the most probable combinations of intra prediction parameters, which may also capture information from neighboring blocks. For example, signaling an index into a table of most probable intra prediction parameter combinations may improve both signaling overhead and coding accuracy.

Example Systems and Devices

Figure 1:
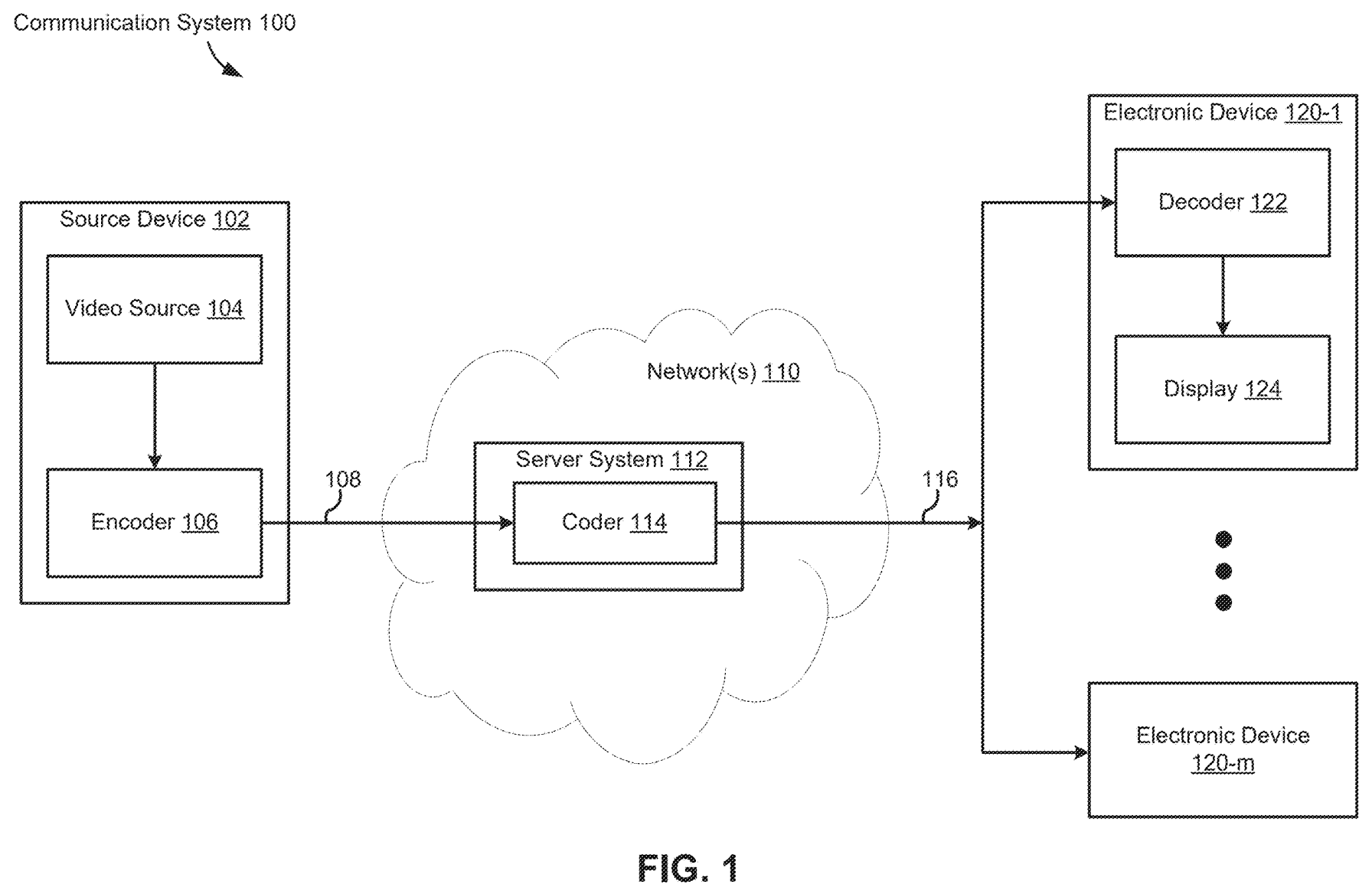

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
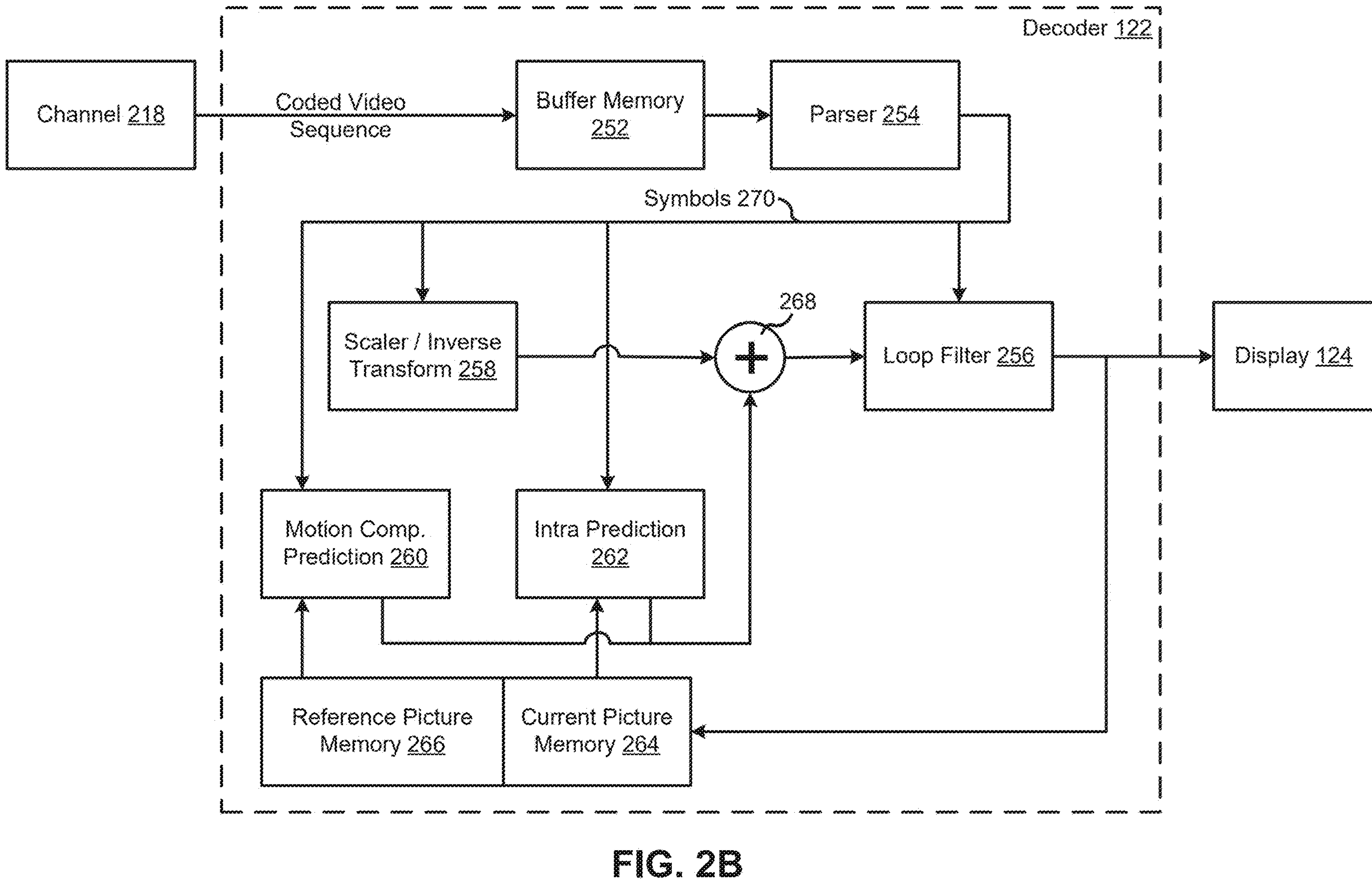
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit

262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
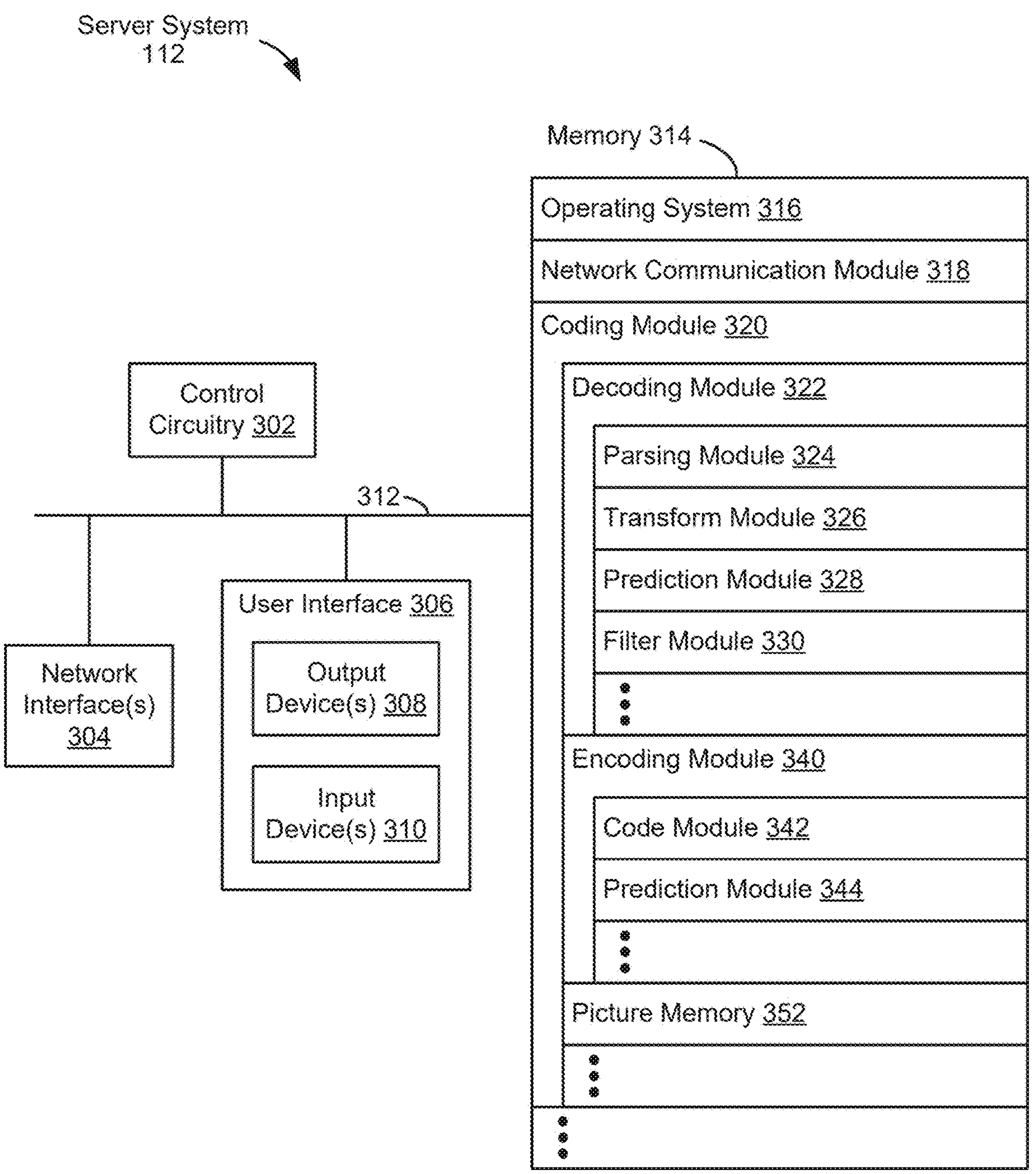
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, intra prediction modes and techniques for joint signaling of intra mode coding parameters are described.

Figure 4A:
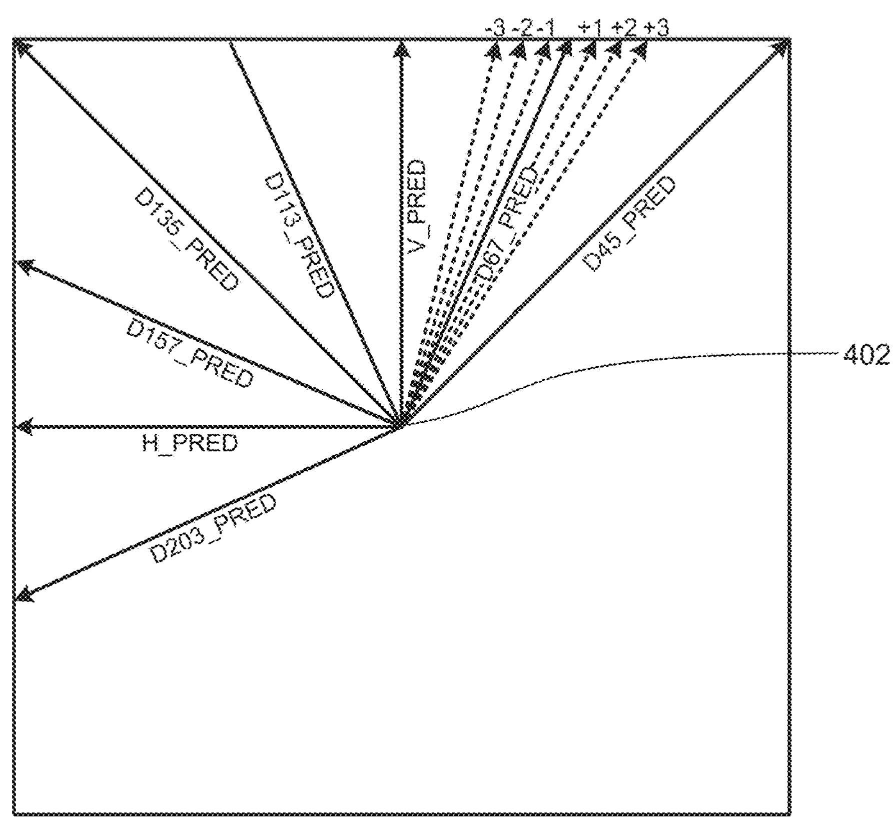
FIG. 4A illustrates example directional intra prediction modes in accordance with some embodiments.

FIG. 4A depicts a subset of predictor directions of various directional intra prediction modes. For directional intra prediction, some approaches support 8 directional modes corresponding to angles from 45 to 207 degrees. To exploit more varieties of spatial redundancy in directional textures, directional intra modes may be extended to an angle set with finer granularity. For example, the 8 angles may be denoted as nominal angles. The 8 nominal angles, named V_PRED, H_PRED, D45_PRED, D135_PRED, D113_PRED, D157_PRED, D203_PRED, and D67_PRED, are shown in FIG. 4A. For each nominal angle, there may be 7 finer angles for a total of 56 directional angles. A prediction angle may be described by a nominal intra angle plus an angle delta. Thus, there are eight nominal directional intra prediction modes, each of which has an associated set of angle delta offsets ranging from −3 to +3. FIG. 4A shows the eight nominal modes (solid arrows) with an example of the set of angle delta offsets around the D67_PRED nominal mode (dotted arrows). The point 402 where the arrows converge represents the sample being predicted. The arrows represent the direction from which neighboring samples are used to predict the sample at point 402. For example, D45_PRED indicates that sample is predicted from a neighboring sample or samples to the upper right, at a 45-degree angle from the horizontal direction. Similarly, D203_PRED indicates that sample is predicted from a neighboring sample or samples to the lower left of sample, in a 22.5-degree angle from the horizontal direction.

Figure 4B:
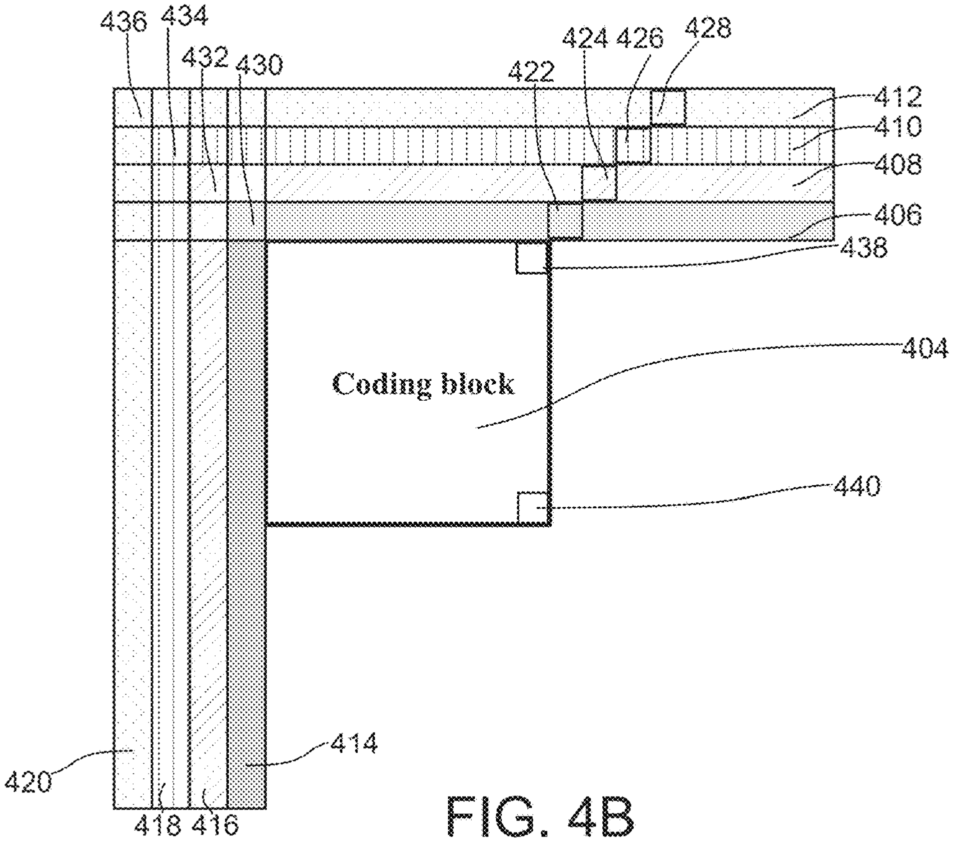
FIG. 4B shows an intra prediction scheme based on various reference lines in accordance with some embodiments.

In some embodiments, reference line index for intra prediction refers to the index of adjacent or non-adjacent neighboring samples for performing intra prediction. FIG. 4B shows an example of multiple reference lines, in accordance with some embodiments. While FIG. 4B shows all the reference lines being adjacent to each other, the allowed reference lines can also be non-adjacent to one another in some embodiments. In some embodiments, cross-component chroma prediction mode refers to a type of chroma intra prediction mode in which corresponding luma samples are used to predict samples in a current chroma block.

In some embodiments, prediction of samples in a coding block or prediction block may be based on one of a set of reference lines. In other words, rather than always using a nearest neighboring line (e.g., the immediate top neighboring line or the immediate left neighboring line of the coding block), multiple reference lines may be provided as options for selection for intra prediction. Such intra prediction implementations may be referred to as Multiple Reference Line Selection (MRLS). In some embodiments, an encoder decides and signals which reference line of a plurality of reference lines is used to generate the intra predictor. At the decoder side, after parsing the reference line index, the intra prediction of current intra-prediction block can be generated by identifying the reconstructed reference samples by looking up the specified reference line according to the intra prediction mode (such the directional, non-directional, and other intra-prediction modes). In some embodiments, a reference line index may be signaled in the coding block level and only one of the multiple reference lines may be selected and used for intra prediction of one coding block. In some examples, more than one reference line may be selected together for intra-prediction. For example, the more than one reference lines may be combined, averaged, interpolated or in any other manner, with or without weight, to generate the prediction. In some example implementations, MRLS may only be applied to some components and not to other components (e.g., applied to luma component and may not be applied to chroma component(s)).

In FIG. 4B, an example of 4 reference-line MRLS is depicted. The intra-coding block 404 may be predicted based on one of the 4 horizontal reference lines 406, 408, 410, and 412 and 4 vertical reference lines 414, 416, 418, and 420. Among these reference lines, 406 and 414 are the immediate neighboring reference lines. The reference lines may be indexed according to their distance from the coding block. For example, reference lines 406 and 414 may be referred to as zero reference line whereas the other reference lines may be referred to as non-zero reference lines. Specifically, reference lines 408 and 416 may be reference as 1$^{st}$ reference lines; reference lines 410 and 418 may be reference as 2$^{nd}$ reference lines; and reference lines 412 and 420 may be reference as 3$^{rd}$ reference lines. For example, if the coding block 404 has an angular/directional intra prediction mode D45_PRED—that is, the samples (e.g., a sample 438) in the coding block 404 are predicted from a prediction sample or samples to the upper right, at a 45-degree angle from the horizontal direction. If the coding block 404 uses reference samples from the zero reference line 406, sample 438 would be predicted from the reference sample 422. If the coding block 404 uses reference samples from the 3$^{rd}$ reference line 412, sample 438 would be predicted from the reference sample 428. Similarly, the reference 426 and the reference sample 424 would be used for prediction if the 2$^{nd}$ reference line 410, and the 1$^{st}$ reference line 408, are used, respectively. For other angular intra prediction modes, such as the D135_PRED mode, reference samples 430, 432, 434, or 436 may be used to predict a sample 440 in the coding block 404.

In some embodiments, instead of signaling the intra prediction mode, and the reference line separately, multiple syntaxes related to intra mode coding may be jointly signaled for one component or multiple components of one coded block. In some embodiments, by jointly signaling multiple syntaxes using a single indicator, higher probability combinations (e.g., angular intra prediction mode and reference line index, or other parameters) may be signaled using low bit. For example, a single indicator may be used to specify both the reference line index and the intra prediction mode. In some embodiments, the use of the reference lines allows information from neighboring blocks to be inherited. In some embodiments, a look-up table containing combinations of intra prediction syntaxes that was used for one or more neighboring blocks may also be used for the current block, and information about the indices of the entries from the look-up table that were used can provide additional information (e.g., statistical information, or other usage information) for the prediction of the current block. Overhead for entropy coding is saved due to the reduction in the number of bits used when multiple syntaxes are jointly signaled.

Figure 4C:
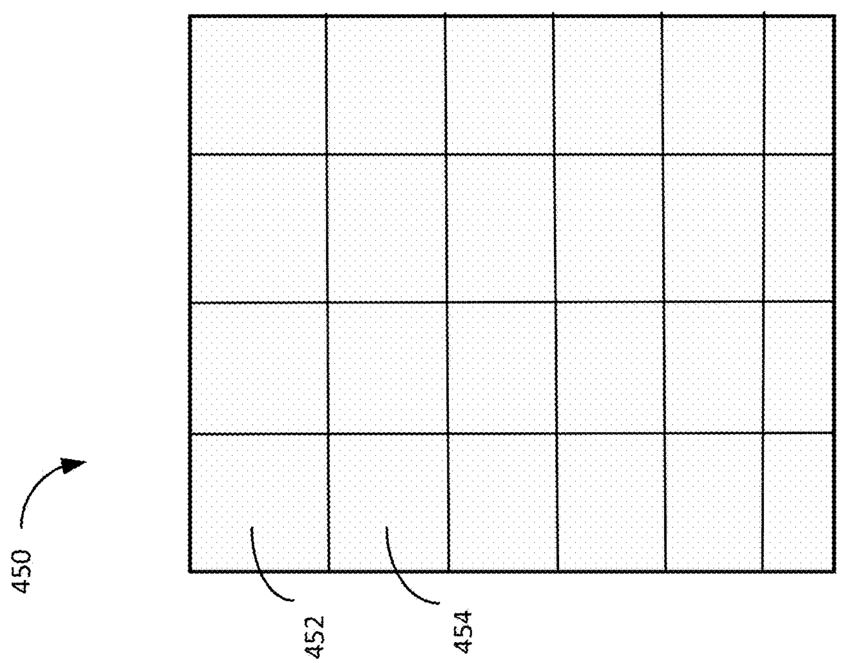
FIG. 4C shows an example look up table in accordance with some embodiments.

FIG. 4C shows an example look up table 450. In some embodiments, an entry 452 combines an intra prediction mode of a left neighboring block with a reference line index of an above neighboring block to provide an entry that contains both the intra prediction mode and the reference line index. In some embodiments, an entry 454 combines an angular intra prediction mode of a second block with an angle delta offset value with a reference line index of a third block to provide an entry that contains both the angular intra prediction mode and the reference line index.

In some embodiments, a look-up table (or list, or set, or group) is constructed based on the coded mode information of adjacent and/or non-adjacent blocks, and each entry of this look-up table includes one or more syntaxes for performing intra prediction, and the index of this look-up table is signaled into the bitstream. In some embodiments, intra prediction mode related syntaxes (e.g., intra prediction mode index, reference line index, matrix-based intra prediction mode index, cross-component intra prediction mode) of adjacent and/or non-adjacent coded blocks are inserted into the look-up table.

In some embodiments, a combination of intra prediction mode related syntax is derived based on the coded information of adjacent and/or non-adjacent coded blocks. For example, an intra prediction mode of one left neighboring block and a reference line index of one above neighboring block may be combined to generate one entry in the look-up table. In some embodiments, the intra prediction mode of one neighboring block is angular intra prediction mode, and the angle is slightly adjusted by adding an offset value, such as +N or −N (where N is a positive integer, such as 1, 2, or 4), but the reference line index is kept unchanged, and the modified combination is then added into the lookup table. In other words, the actual angle of the prediction mode for a neighboring block is used as a starting point for selecting an angular prediction mode, before an offset is added to determine the angular prediction mode for the current block.

In some embodiments, each entry in the look-up table includes a respective intra prediction mode and reference line index. In some embodiments, each entry in the look-up table includes intra prediction mode of a luma component and a chroma component. A signaled syntax is used to indicate whether any combination of intra prediction mode and reference line index in this look-up table is used for coding the current block. If the signaled syntax indicates that the look-up table is used, then an index of this lookup table may be further signaled into the bitstream to indicate which combination (e.g., corresponding to a respective entry in the look-up table) is selected. If the signaled syntax indicates that the look-up table is not used, the intra prediction mode and/or the reference line index is signaled into bitstream separately. In some embodiments, the intra prediction mode includes only the intra prediction mode for the luma component. In some embodiments, when each entry in the look-up table includes a respective intra prediction mode and reference line index, the intra prediction mode may include both the luma and chroma intra prediction mode. For example, in some embodiments, the intra prediction mode is for both the luma and chroma intra prediction mode when the luma block and the chroma block share the same block partitioning and/or transform partitioning. In some embodiments, the look-up table includes an entry that specifies the use of a cross-component chroma prediction mode. When that entry is selected, an additional syntax may be further signaled to indicate which syntax is used for coding the block.

In some embodiments, multiple look-up tables are constructed based on the coded mode information of adjacent and/or non-adjacent blocks. For example, entries in a first look-up table indicate a combination of N1 intra mode related syntaxes, and entries in a second look-up table indicates a combination of N2 intra mode related syntaxes, and entries in a third look-up table indicates a combination N3 intra mode related syntaxes where N1, N2 and N3 are all positive integers. In one example, N1 is 3, N2 is 2, and N3 is 1. In some embodiments, based on coded information of the neighboring blocks, if the most probable modes of the neighboring blocks are different from the current block, different look-up tables are used. For example, if neighbor blocks are coded using smooth modes, then the current block is also likely to be coded using a smooth mode. Based on this information, the size of the look-up table can be made smaller due to information implicitly derived from the neighboring blocks.

In some embodiments, the selection of the look-up tables is first signaled into the bitstream. One index corresponding to an entry in the selected table is further signaled, and the corresponding combination of intra prediction mode related syntaxes are used for one coding block.

In some embodiments, a first flag is signaled at block-level into the bitstream to indicate whether multiple syntaxes related to intra mode coding are jointly signaled for one component or multiple components. When the first flag is signaled with a value that indicates multiple syntaxes related to intra mode coding are jointly signaled, a subsequent indicator is then used to indicate a specific combination of an entry in a look-up table or a list. When the first flag is signaled with a value that indicates multiple syntaxes related to intra mode coding are not jointly signaled, the intra mode coding related syntaxes are signaled separately.

In some embodiments, a first flag may be signaled at block-level into the bitstream to indicate whether multiple syntaxes related to intra mode coding is jointly signaled for all components. When the first flag is signaled with a value that indicates intra mode coding related syntaxes are not jointly signaled for all components, a second flag is signaled to indicate whether multiple syntaxes related to intra mode coding Are jointly signaled for a subset of color components (e.g., two chroma components Cb, Cr).

In some embodiments, one high level syntax (HLS) is signaled into the bitstream at the sequence/frame/picture/slice/super block level to indicate whether the joint signaling of intra mode related syntax is used. In some embodiments, one sequence level indicator is first signaled into the bitstream to indicate whether joint signaling is allowed for each sequence. If so, another high-level syntax is signaled at the frame/picture/slice level to further indicate the usage of the joint signaling methodologies described herein.

Figures 5A, 5B:
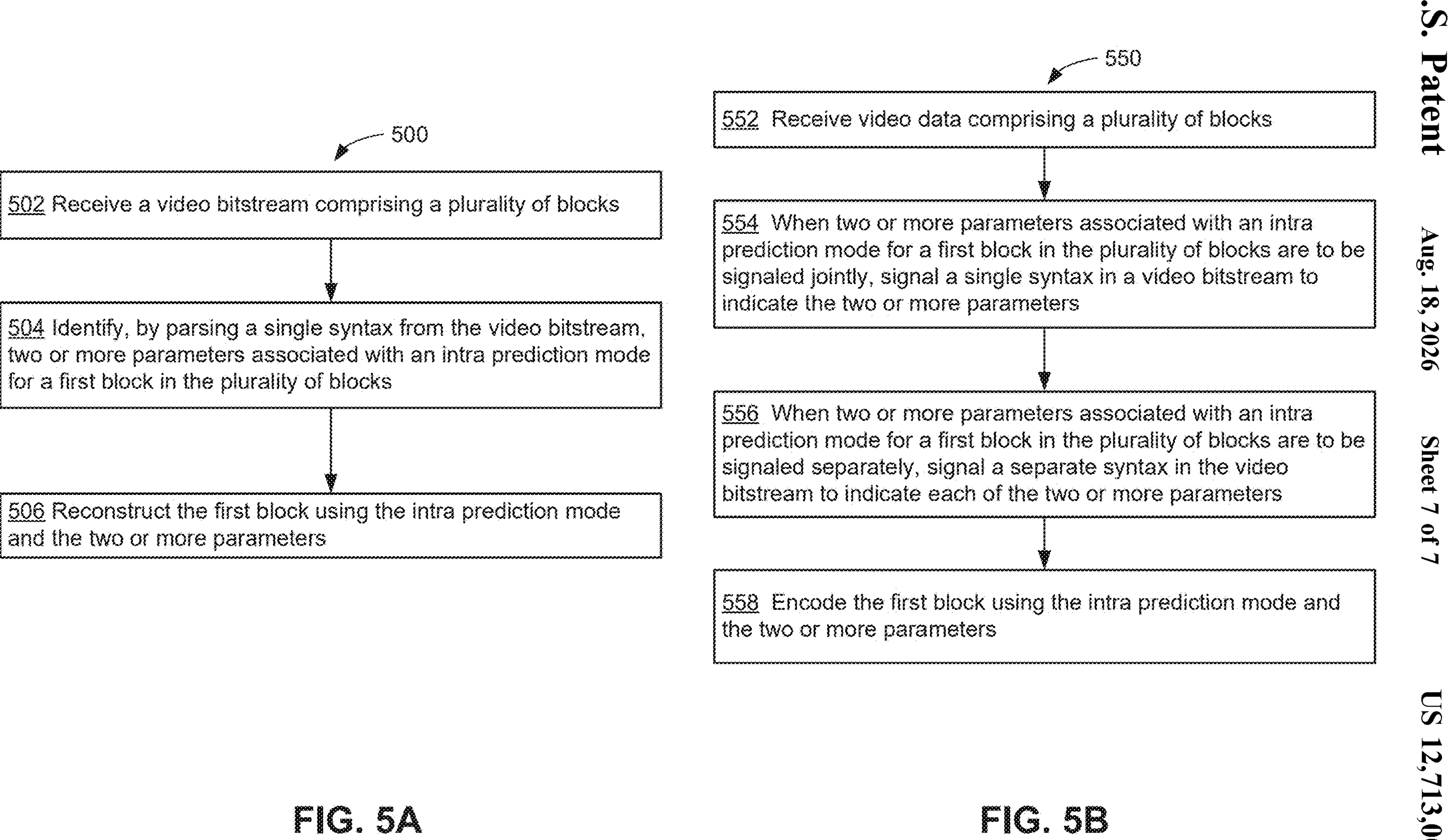
FIG. 5A illustrates an example video decoding process in accordance with some embodiments.
FIG. 5B illustrates an example video encoding process in accordance with some embodiments.

FIG. 5A is a flow diagram illustrating a method 500 of decoding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system receives (502) a video bitstream (e.g., a coded video sequence) comprising a plurality of blocks. The system identifies (504), by parsing a single syntax from the video bitstream, two or more parameters associated with an intra prediction mode for a first block in the plurality of blocks. The system reconstructs (506) the first block using the intra prediction mode and the two or more parameters. In this way, multiple syntaxes related to intra mode coding may be jointly signaled for one component or multiple components of one coded block.

In some embodiments, one look-up table (or list, or set, or group) is constructed based on the coded mode information of adjacent and/or non-adjacent blocks, and each entry of this look up table includes multiple syntaxes for performing intra prediction, and the index of this look-up table may be signaled into the bitstream. In some embodiments, the intra prediction mode related syntaxes of the adjacent and/or non-adjacent coded blocks may be inserted into the look-up table. Examples of intra prediction mode related syntaxes, include but are not limited to intra prediction mode index, reference line index, matrix-based intra prediction mode index, cross-component intra prediction mode.

In some embodiments, the combination of intra prediction mode related syntax combination can be derived based on the coded information of adjacent and/or non-adjacent coded blocks. In some embodiments, the intra prediction mode of one left neighboring block and reference line index of one above neighboring block are combined to generate one entry in the look-up table. In some embodiments, the intra prediction mode of one neighboring block is an angular intra prediction mode, and this angle is slightly adjusted by adding an offset value, such as +N or −N, but the reference line index is kept unchanged, and then added into the look-up table. N is a positive integer, such as 1 or 2 or 4.

In some embodiments, each entry in the look-up table includes an intra prediction mode and a reference line index, one syntax may be signaled into the bitstream to indicate whether any combination of intra prediction mode and reference line index in this look-up table is used or not. For example, if yes, then one index of this look-up table may be further signaled into the bitstream to indicate which combination is selected. In this example, if not, then the intra prediction mode and/or the reference line index is signaled into the bitstream separately.

In some embodiments, the intra prediction mode only includes the intra prediction of the luma component. In some embodiments, the intra prediction mode here includes both the luma and chroma intra prediction mode. In some embodiments, this is only applied when luma and chroma block are sharing the same block partitioning and/or transform partitioning. In some embodiments, a cross-component chroma prediction mode is used for one entry. If this entry is selected, then additional syntax may be further signaled to indicate which syntax is used for coding the selected block.

In some embodiments, each entry in the look-up table includes intra prediction mode of luma component and chroma component.

In some embodiments, multiple look-up tables are constructed based on the coded mode information of adjacent and/or non-adjacent blocks, and the meaning of each entry in different look-up tables may be different. For instance, entries in the first look-up table correspond to a combination of N1 intra mode related syntaxes, and entries in the second look-up table correspond to a combination of N2 intra mode related syntaxes, and entries in the third look-up table correspond to a combination N3 intra mode related syntaxes. N1, N2 and N3 are all positive integers. For example, N1 may be 3, N2 may be 2, and N3 may be 1.

In some embodiments, the selection of the look-up tables is first signaled into the bitstream, and if one look-up table is selected, then one index of the corresponding table is further signaled, and the corresponding combination of intra prediction mode related syntaxes are used for one coded block.

In some embodiments, a first flag may be signaled at block-level into the bitstream to indicate whether multiple syntaxes related to intra mode coding is jointly signaled for one component or multiple components.

In some embodiments, when the first flag is signaled with a value that indicates multiple syntaxes related to intra mode coding is jointly signaled, then methodologies described above apply. Otherwise, when the first flag is signaled with a value that indicates multiple syntaxes related to intra mode coding are not jointly signaled, then the intra mode coding related syntaxes are signaled separately. In some embodiments, a first flag may be signaled at block-level into the bitstream to indicate whether multiple syntaxes related to intra mode coding is jointly signaled for all components, if this first flag is signaled with a value that indicates intra mode coding related syntaxes are not jointly signaled for all components, then a second flag may be signaled to indicate whether multiple syntaxes related to intra mode coding is jointly signaled for a subset of color components (e.g., two chroma components).

In some embodiments, one high level syntax may be signaled into the bitstream at a sequence, frame, picture, slice, or super block level to indicate whether the joint signaling of intra mode related syntax is used. In some embodiments, a sequence level indicator is first signaled into the bitstream to indicate whether joint syntax signaling is allowed for each sequence. If so, another high-level syntax is signaled at the frame, picture, or slice level to further indicate the usage of joint syntax signaling methodologies described herein.

FIG. 5B is a flow diagram illustrating a method 550 of encoding video in accordance with some embodiments. The method 550 may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system. In some embodiments, the method 550 is performed by a same system as the method 500 described above.

The system receives (552) video data (e.g., a source video sequence) comprising a plurality of blocks (e.g., corresponding to a set of pictures). When two or more parameters associated with an intra prediction mode for a first block in the plurality of blocks are to be signaled jointly, the system signals (554) a single syntax in a video bitstream to indicate the two or more parameters. When two or more parameters associated with an intra prediction mode for a first block in the plurality of blocks are to be signaled separately, the system signals (556) a separate syntax in the video bitstream to indicate each of the two or more parameters. The system encodes (558) the first block using the intra prediction mode and the two or more parameters. As described previously, the encoding process may mirror the decoding processes described herein (e.g., the joint signaling techniques described above). For brevity, those details are not repeated here.

Although FIGS. 5A and 5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 500) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) comprising a plurality of blocks; (ii) identifying, by parsing a single syntax from the video bitstream, two or more parameters associated with an intra prediction mode for a first block in the plurality of blocks; and (iii) reconstructing the first block using the intra prediction mode and the two or more parameters. For example, multiple syntaxes related to intra mode coding may be jointly signaled for one component or multiple components of one coded block.

(A2) In some embodiments of A1, the two or more parameters comprise a reference line index and an index for the intra prediction mode.

(A3) In some embodiments of A2, the intra prediction mode is for a luma component of the first block. For example, the intra prediction mode only includes the intra prediction of the luma component. In some embodiments, the intra prediction mode includes both the luma and chroma intra prediction mode. In some embodiments, each entry in the look-up table includes an intra prediction mode of a luma component and a chroma component.

(A4) In some embodiments of A2, when a luma component and a chroma component of the first block share one or more of a same block partitioning, and a same transform partitioning, the intra prediction mode corresponds to the luma component and the chroma component; and when the luma component and the chroma component do not share the same block partitioning, or the same transform partitioning, the intra prediction mode corresponds to only the luma component. For example, the shared intra prediction mode information is only applied when luma and chroma block are sharing the same block partitioning and/or transform partitioning.

(A5) In some embodiments of any of A1-A4, the two or more parameters are identified using a value of the single syntax and a look-up table. For example, a look-up table (or list, set, or group) is constructed based on coded mode information of adjacent and/or non-adjacent blocks, each entry of this look-up table includes multiple syntaxes for performing an intra prediction, and the index of this look-up table is signaled into the bitstream.

(A6) In some embodiments of A5, the method further includes populating the look-up table using intra prediction mode indicators of one or more previously decoded blocks. For example, the intra prediction mode related syntaxes of the adjacent and/or non-adjacent coded blocks may be inserted into the look-up table. Example intra prediction mode related syntaxes include an intra prediction mode index, a reference line index, a matrix-based intra prediction mode index, and a cross-component intra prediction mode.

(A7) In some embodiments of A5 or A6, the method further includes generating an entry for the look-up table based on coded information of one or more previously decoded blocks. For example, the intra prediction mode related syntax combination may be derived based on the coded information of adjacent and/or non-adjacent coded blocks.

(A8) In some embodiments of any of A5-A7, an intra prediction mode of a left neighboring block is combined with a reference line index of an above neighboring block to generate the entry for the look-up table. For example, the intra prediction mode of a left neighboring block and reference line index of an above neighboring block are combined to generate one entry in the look-up table.

(A9) In some embodiments of any of A5-A8, an angular intra prediction mode of a second block with an offset value is combined with a reference line index of a third block to generate the entry for the look-up table. For example, the intra prediction mode of a neighboring block is angular intra prediction mode, and this angle is slightly adjusted by adding an offset value, such as +N or −N, whereas the reference line index is kept unchanged, and then added into the look-up table. In this example, N is a positive integer, such as 1 or 2 or 4.

(A10) In some embodiments of any of A5-A9, an entry in the look-up table corresponds to a cross-component chroma prediction mode; and, when the entry in the look-up table is selected for the first block, an additional indicator in the video bitstream is signaled to indicate which syntax is used for coding the first block. For example, when a cross-component chroma prediction mode is used for an entry, and this entry is selected, then additional syntax may be further signaled to indicate which syntax is used for coding the selected block.

(A11) In some embodiments of any of A1-A10: (i) the two or more parameters are identified by parsing the single syntax when an indicator in the video bitstream indicates that the two or more parameters are signaled jointly; and (ii) the method further includes, when the indicator in the video bitstream indicates that the two or more parameters are signaled separately, identifying the two or more parameters based on a plurality of syntax from the video bitstream. For example, each entry in the look-up table includes an intra prediction mode and a reference line index, and one syntax may be signaled into the bitstream to indicate whether any combination of intra prediction mode and reference line index in this look-up table is used. If yes, then one index of this look-up table may be further signaled into the bitstream to indicate which combination is selected. If not, then the intra prediction mode and the reference line index are signaled into bitstream separately. As another example, a flag may be signaled (e.g., at a block level) in the bitstream to indicate whether multiple syntaxes related to intra mode coding are jointly signaled for a component or multiple components. For example, when the flag is signaled with a value that indicates multiple syntaxes related to intra mode coding is jointly signaled, then methods described above apply, otherwise, when this flag is signaled with a value that indicates multiple syntaxes related to intra mode coding is not jointly signaled, then the intra mode coding related syntaxes are signaled separately.

(A12) In some embodiments of A11, the indicator is signaled in a high-level syntax of the video bitstream. For example, a high-level syntax may be signaled into the bitstream at a sequence, frame, picture, slice, or super block level to indicate whether the joint signaling of intra mode related syntax is used. As another example, a sequence level indicator is first signaled in the bitstream to indicate whether joint signaling is allowed for a particular sequence. If yes, then another high-level syntax may be signaled at a frame, picture, or slice level to further indicate the usage of the joint signaling for those components.

(A13) In some embodiments of any of A1-A12: (i) the method further includes determining, based on a first indicator in the video bitstream, whether intra mode parameters for all components are signaled jointly; (ii) when the first indicator indicates that the intra mode parameters for all components are signaled jointly, the two or more parameters are identified by parsing the single syntax; (iii) when the first indicator indicates that the intra mode parameters for all components are not signaled jointly, parsing a second indicator that indicates whether intra mode parameters for a current component are signaled jointly; and (iv) when the second indicator indicates that the intra mode parameters for the current component are signaled jointly, the two or more parameters are identified by parsing the single syntax. For example, a first flag may be signaled at a block level into the bitstream to indicate whether multiple syntaxes related to intra mode coding are jointly signaled for all components, if this first flag is signaled with a value that indicates intra mode coding related syntaxes are not jointly signaled for all components, then a second flag may be signaled to indicate whether multiple syntaxes related to intra mode coding are jointly signaled for a subset of color components (e.g., two chroma components). In some embodiments, when the first indicator indicates that the intra mode parameters for all components are not signaled jointly, the second indicator is not signaled/parsed. In some embodiments, when the second indicator indicates that the intra mode parameters for the current component are not signaled jointly, the two or more parameters are identified by parsing multiple syntaxes.

(A14) In some embodiments of any of A1-A13, the method further includes selecting a first look-up table from a set of look-up tables for use with the first block, where the two or more parameters are identified using a value of the single syntax and the first look-up table. For example, multiple look-up tables may be constructed based on the coded mode information of adjacent and/or non-adjacent blocks, and the meaning of each entry in different look-up tables may be different. For instance, entries in the first look-up table indicate a combination of N1 intra mode related syntaxes, and entries in the second look-up table indicates a combination of N2 intra mode related syntaxes, and entries in the third look-up table indicates a combination N3 intra mode related syntaxes. N1, N2 and N3 are all positive integers. In one example, N1 is 3, N2 is 2, and N3 is 1. In some embodiments, the set of look-up tables are populated using coded information from one or more previously decoded blocks (e.g., neighboring blocks).

(A15) In some embodiments of A14, the first look-up table is selected based on an indicator in the video bitstream. For example, the selection of the look-up tables first signaled into the bitstream, and if a look-up table is selected, then an index in the corresponding table is further signaled, and the corresponding combination of intra prediction mode related syntaxes are used for one coded block. As an example, if multiple neighboring blocks are encoded with a smooth mode then the first block is more likely to be encoded with the smooth mode and a look-up table corresponding to the smooth mode is selected. In this way the size of each look-up table may be reduced.

(B1) In another aspect, some embodiments include a method (e.g., the method 550) of video encoding. In some embodiments, the method is performed at a computing system (e.g., the server system 112) having memory and control circuitry. In some embodiments, the method is performed at a coding module (e.g., the coding module 320). The method includes: (i) receiving video data (e.g., a source video sequence) comprising a plurality of blocks; (ii) when two or more parameters associated with an intra prediction mode for a first block in the plurality of blocks are to be signaled jointly, signaling a single syntax in a video bitstream to indicate the two or more parameters; (iii) when two or more parameters associated with an intra prediction mode for a first block in the plurality of blocks are to be signaled separately, signaling a separate syntax in the video bitstream to indicate each of the two or more parameters; and (iv) encoding the first block using the intra prediction mode and the two or more parameters.

(B2) In some embodiments of B1, the two or more parameters comprise a reference line index and an index for the intra prediction mode.

(B3) In some embodiments of B1 or B2, the one or more sets of instructions further comprise instructions for signaling an indicator in the video bitstream that indicates whether the two or more parameters are signaled jointly.

(B4) In some embodiments of B1-B3, the one or more sets of instructions further comprise instructions for: (i) signaling a first indicator in the video bitstream that indicates whether intra mode parameters are signaled jointly for all components in a set of components; and (ii) when the first indicator indicates that the intra mode parameters are not signaled jointly for all components in the set of components, signaling a second indicator in the video bitstream that indicates whether intra mode parameters are signaled jointly for a particular component in the set of components.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule. The video bitstream comprises a plurality of blocks, including a first block and a syntax element indicating two or more parameters associated with an intra prediction mode of the first block. The format rule specifies that the first block is to be reconstructed using the intra prediction mode and the two or more parameters.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A15, B1-B4, and C1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A15, B1-B4, and C1 above).

Unless otherwise specified, any of the syntax elements (e.g., indicators) described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising method of video decoding performed at a computing system having memory and one or more processors, the method comprising:

receiving a video bitstream comprising a plurality of blocks;

identifying, by parsing a single syntax from the video bitstream, two or more parameters associated with an intra prediction mode for a first block in the plurality of blocks; and generating an entry for a look-up table based on coded information of one or more previously decoded blocks;

reconstructing the first block using the intra prediction mode and the two or more parameters, wherein the two or more parameters are identified using a value of the single syntax and the look-up table, wherein an intra prediction mode of a left neighboring block is combined with a reference line index of an above neighboring block to generate the entry for the look-up table that contains both the intra prediction mode and the reference line index, or wherein an angular intra prediction mode of a second block that includes an angle delta offset value is combined with a reference line index of a third block to generate the entry for the look-up table that contains both the angle delta offset value and the reference line index.

2. The method of claim 1, wherein the two or more parameters comprise a reference line index and an index for the intra prediction mode.

3. The method of claim 2, wherein the intra prediction mode is for a luma component of the first block.

4. The method of claim 2, wherein:

when a luma component and a chroma component of the first block share one or more of a same block partitioning, and a same transform partitioning, the intra prediction mode corresponds to the luma component and the chroma component; and when the luma component and the chroma component do not share the same block partitioning, or the same transform partitioning, the intra prediction mode corresponds to only the luma component.

5. The method of claim 1, wherein the two or more parameters are identified using a value of the single syntax and a look-up table.

6. The method of claim 5, further comprising populating the look-up table using intra prediction mode indicators of one or more previously decoded blocks.

7. The method of claim 5, wherein:

an entry in the look-up table corresponds to a cross-component chroma prediction mode; and when the entry in the look-up table is selected for the first block, an additional indicator in the video bitstream is signaled to indicate the single syntax that is used for coding the first block.

8. The method of claim 1, wherein the two or more parameters are identified by parsing the single syntax when an indicator in the video bitstream indicates that the two or more parameters are signaled jointly; and the method further comprising, when the indicator in the video bitstream indicates that the two or more parameters are signaled separately, identifying the two or more parameters based on a plurality of syntax from the video bitstream.

9. The method of claim 8, wherein the indicator is signaled in a high-level syntax of the video bitstream.

10. The method of claim 1, further comprising determining, based on a first indicator in the video bitstream, whether intra mode parameters for all components are signaled jointly;

when the first indicator indicates that the intra mode parameters for all components are signaled jointly, the two or more parameters are identified by parsing the single syntax;

when the first indicator indicates that the intra mode parameters for all components are not signaled jointly, parsing a second indicator that indicates whether intra mode parameters for a current component are signaled jointly; and when the second indicator indicates that the intra mode parameters for the current component are signaled jointly, the two or more parameters are identified by parsing the single syntax.

11. The method of claim 1, further comprising selecting a first look-up table from a set of look-up tables for use with the first block, wherein the two or more parameters are identified using a value of the single syntax and the first look-up table.

12. The method of claim 11, wherein the first look-up table is selected based on an indicator in the video bitstream.

13. A computing system, comprising:

control circuitry;

memory; and one or more sets of instructions stored in the memory and configured for execution by the control circuitry, the one or more sets of instructions comprising instructions for:

receiving video data comprising a plurality of blocks;

when two or more parameters associated with an intra prediction mode for a first block in the plurality of blocks are to be signaled jointly, signaling a single syntax in a video bitstream to indicate the two or more parameters; and generating an entry for a look-up table, wherein the two or more parameters are identified using a value of the single syntax and the look-up table, wherein an intra prediction mode of a left neighboring block is combined with a reference line index of an above neighboring block to generate the entry for the look-up table that contains both the intra prediction mode and the reference line index, or wherein an angular intra prediction mode of a second block that includes an angle delta offset value is combined with a reference line index of a third block to generate the entry for the look-up table that contains both the angle delta offset value and the reference line index;

when two or more parameters associated with an intra prediction mode for a first block in the plurality of blocks are to be signaled separately, signaling a separate syntax in the video bitstream to indicate each of the two or more parameters; and encoding the first block using the intra prediction mode and the two or more parameters.

14. The computing system of claim 13, wherein the two or more parameters comprise a reference line index and an index for the intra prediction mode.

15. The computing system of claim 13, wherein the one or more sets of instructions further comprise instructions for signaling an indicator in the video bitstream that indicates whether the two or more parameters are signaled jointly.

16. The computing system of claim 13, wherein the one or more sets of instructions further comprise instructions for:

signaling a first indicator in the video bitstream that indicates whether intra mode parameters are signaled jointly for all components in a set of components; and when the first indicator indicates that the intra mode parameters are not signaled jointly for all components in the set of components, signaling a second indicator in the video bitstream that indicates whether intra mode parameters are signaled jointly for a particular component in the set of components.

17. A non-transitory computer-readable storage medium storing a video encoding method, the video encoding method comprising:

receiving video data comprising a plurality of blocks;

when two or more parameters associated with an intra prediction mode for a first block in the plurality of blocks are to be signaled jointly, signaling a single syntax in a video bitstream to indicate the two or more parameters; and generating an entry for a look-up table, wherein the two or more parameters are identified using a value of the single syntax and the look-up table, wherein an intra prediction mode of a left neighboring block is combined with a reference line index of an above neighboring block to generate the entry for the look-up table that contains both the intra prediction mode and the reference line index, or wherein an angular intra prediction mode of a second block that includes an angle delta offset value is combined with a reference line index of a third block to generate the entry for the look-up table that contains both the angle delta offset value and the reference line index;

when two or more parameters associated with an intra prediction mode for a first block in the plurality of blocks are to be signaled separately, signaling a separate syntax in the video bitstream to indicate each of the two or more parameters; and encoding the first block using the intra prediction mode and the two or more parameters, wherein the video bitstream comprises a signaled single syntax, or separately signaled syntaxes to indicate each of the two or more parameters.

* * * * *